Oct. 12, 1948.  C. M. CANDY ET AL  2,451,319
TOTALIZATOR INDICATOR CONTROL
Filed Aug. 15, 1946  2 Sheets-Sheet 1

INVENTORS.
CHARLES M. CANDY
WILLIAM WALTER OWEN
BY
ATTORNEY

Oct. 12, 1948.  C. M. CANDY ET AL  2,451,319
TOTALIZATOR INDICATOR CONTROL
Filed Aug. 15, 1946  2 Sheets-Sheet 2
FIG. 2
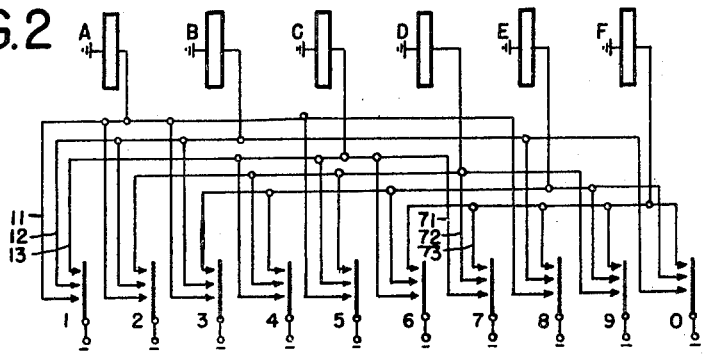
FIG. 3
| NUMBERING OF LAMPS | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |
| 36 | 37 | 38 | 39 | 40 |
FIG. 4
| CODE CHART | | | | | | |
|---|---|---|---|---|---|---|
| DIGITS | RELAYS | | | | | |
|  | A | B | C | D | E | F |
| 1 | X | X | X |  |  |  |
| 2 | X | X |  | X |  |  |
| 3 | X | X |  |  | X |  |
| 4 |  |  | X | X | X |  |
| 5 | X |  | X | X |  |  |
| 6 |  | X |  | X | X |  |
| 7 |  |  | X | X |  | X |
| 8 | X | X |  |  |  | X |
| 9 |  |  | X | X | X |  |
| 0 |  | X |  |  | X | X |
FIG. 5
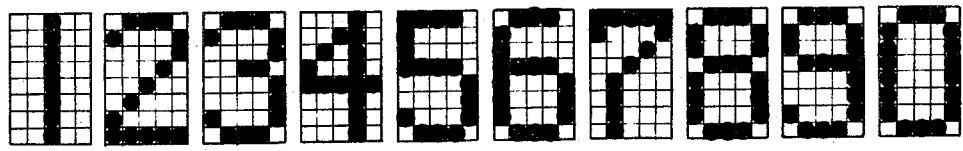
INVENTORS
CHARLES M. CANDY
WILLIAM WALTER OWEN
BY
ATTORNEY Patented Oct. 12, 1948

2,451,319

UNITED STATES PATENT OFFICE 2,451,319

TOTALIZATOR INDICATOR CONTROL

Charles M. Candy, Chicago, and William Walter Owen, Elgin, Ill., assignors to Automatic Electric Laboratories, Inc., Chicago, Ill., a corporation of Delaware Application August 15, 1946, Serial No. 690,798

2 Claims. (Cl. 177—353)

1

The present invention relates to electric totalizator systems, in which apparatus is provided to record the number of events which take place at a public gathering, such as the number of investments made by the public or the recording of the number of sales of commodities, and to transmit a record of these happenings, which may be initiated at several different places, to a totaling mechanism and finally to display the various totals on a panel or score board in full view of the public who are taking part, or interested in the records of the competition or other matter of public concern.

This invention has particular reference to that part of the system known as the monogram type indicator, by which the digits required to make up the numerical totals are formed by illuminating groups of lamps in a series of lamp bays, there being as many lamp bays in each panel as there are order of digits required in a total display. The number of lamps which are lighted at any one instant in each bay are continually changing as the events are being recorded by the totalizing equipment with the result that the public are able to view a running record of progress of events in which they are interested. When such a panel is used to display a record of the issuing of tickets at a race track, the indicator board at all times shows the total number of tickets issued, from a large number of issuing booths, on each contestant in each particular event and under various classifications such as, "win," "place," "show," etc., and also the grand total for each of these classes. These indicators can be duplicated in several localities should conditions require more than one display.

One object of this invention is to provide an unique circuit arrangement of the contacts of a group of relays, whereby the lamps in the monogram type indicator, are lighted to form the respective digits. Another object of this invention is to arrange the circuit so that the display of any digit requires the operation of a particular number of relays of the group, neither more nor less, and any variation of this fixed quantity of relays, which will result in showing a mutilated numeral, will give an indication of an unstandard condition and will call the attention of an attendant to a functional error, requiring immediate attention. The correct lamps to form any digit may be lighted by current from a storage battery or an ordinary commercial electricity source.

2

The monogram type indicator of this invention comprises forty lamps arranged in five vertical rows of eight lamps per row. To display the digit "1" eight lamps are lighted, and for the digit "8" nineteen lamps are lighted, while the other digits each require from thirteen to eighteen lamps to be lighted.

A distinct feature of this invention is the control of the current supply to the lamps of each indicator from the contacts of a group of six relays which are operated from the totalizating equipment, wherein three relays of the group are always energized to cause the display of any one of the digits from "1" to "9" and "0," neither less nor more than three relays in the display group and due to this feature an additional control or supervision is obtained.

The particular set of three relays which are energized to display the required digit is determined by the collecting, adding and counting switches in the totalizator equipment which are not parts of the present invention.

The invention is disclosed in two sheets of drawings comprising Figures 1 to 5 inclusive, which diagrammatically show sufficient of the circuits and apparatus of the invention to enable same to be understood when accompanied by the explanation which follows:

Figure 2 illustrates the six relays and a simplified wiring circuit to show how the different combinations are energized from the totalizing equipment.

Figure 3 shows the numbering of the lamps in one bay for displaying any digit.

Figure 4 shows a code chart indicating which of the relays of Figure 1 are operated to display each digit.

Figure 1:
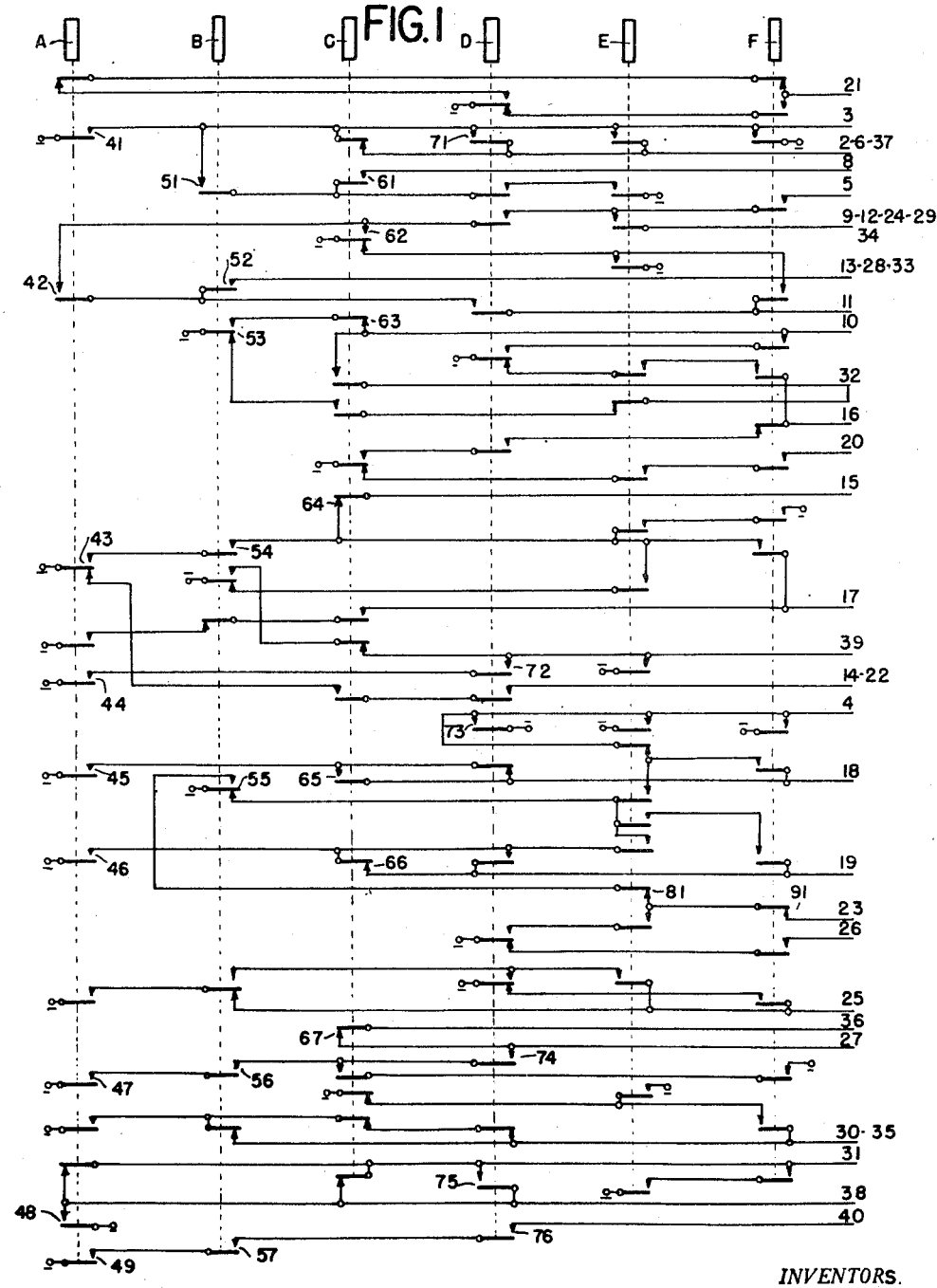
Figure 1 shows the unique circuit arrangement of the contacts of the six relays.

Figure 5 indicates how the various digits appear in the lamp indicator when various groups of lamps are lighted to display the digits.

Figure 1 is a wiring diagram of the contact springs of six relays, designated A, B, C, D, E and F, each with a plurality of make and break contacts. These relays are energized, from collecting and adding machines (not shown) of the totalizing equipment, in the combinations as indicated in Figure 4.

Figure 2 is a sketch to show one method of operating the six relays in groups of three. As stated above, the adding machines (not shown) in the totalizing equipment cause contacts to be closed to complete circuits to the group of six relays associated with the monogram indicator, which are operated in combinations of three. In Figure 2, the numbers 1 to 9 and 0 represent armatures in the totalizing equipment which will be operated from time to time as the events continue to occur and the adding machine records same for display to the public. For example, as soon as one event has taken place, the adding machine would be in a position to operate armature number 1, connecting negative battery over the three conductors 11, 12 and 13 to the three relays A, B and C respectively, operating these relays, the wiring of the contacts of said relays being shown in Figure 1. Again, as the recording proceeds and, for example, seven events have taken place, the adding machine would cause armature number 7 to operate, furnishing battery over conductors 71, 72 and 73 to energize relays C, D and F, which in turn would cause the numeral seven to be displayed. For example, when it is required that digit "one" be displayed, the totalizing equipment will energize relays A, B, and C, causing the vertical row of eight lamps numbered 3, 8, 13, 18, 23, 28, 33 and 38 as shown in Figure 3 to be illuminated, forming the digit "one" which is displayed to the public as seen in Figure 5.

With relays A, B and C operated, the circuit for these eight lamps can be traced in Figure 1, as follows; from battery through contact number 41 on relay A direct to lamp number 3; battery through contact number 41 on relay A, contact 51 on relay B and contact 61 on relay C to lamp number 8; battery through contact 62 on relay C, contact 42 on relay A, contact 52 on relay B to lamps 13, 28 and 33; battery through contact 45 on relay A, contact 65 on relay C to lamp number 18; battery through contact 55 on relay B, through contact 81 on relay E, contact 91 on relay F to lamp 23; and battery through contact 48 on relay A to lamp number 38, causing the numeral "one" to be illuminated in the monogram lamp box of the display panel. As the collecting and adding machines continue to record the events which are taking place, the three relay combinations continue to alter. The A, B, D combination when energized will cause a total of fifteen lamps to be lighted, that is lamps numbered 2, 3, 4, 6, 10, 15, 19, 23, 27, 31, 36, 37, 38, 39 and 40, which will cause the digit "two" to be displayed in the monogram indicator as it appears in Figure 5.

The circuit for these fifteen lamps, with relays "A," "B" and "D" energized, may be traced in Figure 1, as follows; battery through contact number 41 on relay A, contact 71 on relay D to lamps 2, 6 and 37; battery through contact 41 on relay A to lamp number 3; battery through contact 73 on relay D to lamp 4; battery through contact 53 on relay B, contact 63 on relay C to lamp 10; battery through contact 43 on relay A, contact 54 on relay B, contact 64 on relay C to lamp 15; battery through contact 46 on relay A, contact 66 on relay C to lamp 19; battery through contact 55 on relay B, contact 81 on relay E, contact 91 on relay F to lamp 23; battery through contact 47 on relay A, contact 56 on relay B, contact 74 on relay D to lamp 27, and from the latter contact 74 through contact 67 on relay C to lamp 36; battery through contact 48 on relay A, contact 75 on relay D to lamp 31; battery through contact 48 on relay A to lamp 38; battery through contact 44 on relay A, contact 72 on relay D to lamp 39; and battery through contact 49 on relay A, contact 57 on relay B, contact 76 on relay D to lamp number 40, causing the numeral 2 to be displayed. It will be noted by the code chart, Figure 4, that three relays, neither more nor less, will be energized to form any one of the ten Arabic numerals in each indicator and, due to this fact, an unstandard condition would at once be evident, should any number of relays, other than three, be energized at the same time, due to the lighting of either too many or too few lights and the consequent mutilated display.

Figure 3 shows the numbering of the lamps in any one of the units of the monogram indicator panel. A unit consists of a suitable housing with individual compartments for each lamp, which are so arranged that the light rays from any lamp cannot penetrate the side walls of its compartment and intermingle with the rays of light from adjacent lamps. The light rays are therefore projected from the front of each individual lamp housing and diffused with the rays from the other lamps which are at the same moment lighted, to form a numeral of surprisingly accurate proportions due to the larger number of lamps used in this invention, as compared with the smaller number of lamps used in previously designed indicators, and can be recognized from great distances, even in daylight.

Figure 4 is a code chart to show the various groups of relays which are operated in the forming of the digits from "1" to "9" and "0." Of a group of relays, wherein three, neither more nor less, are operated simultaneously to form any digit, only ten combinations of three relays are required in this invention. It should be repeated here that the particular combination of three relays of any one unit which will operate at any instant, is determined by the values registered in the collecting and adding machines of the totalizing equipment, which machines are not a part of this invention and are not shown herein.

Figure 5 shows ten indicator units, each made up of five vertical rows of lamps with eight lamps per row. Should the totaling equipment for any one installation be required to show a number composed of five digits, say up to 99999, then the monogram indicator for this totaling equipment would require five indicator units, one for each of the digits in this total number. Should less than three or more than three relays of the group, be energized at one time the result would be a mutilated display or no display and thus indicate an understandard condition.

What we claim as new and desire to secure by Letters Patent of the United States is:

1. In a display system for displaying numerals one to nine and naught inclusive, a set of lamps arranged so that all said numerals may be formed and displayed one at a time by lighting said lamps in different combinations, a group of six relays, circuits controlled by said relays for lighting said lamps in said different combinations, means for always operating only three of said relays neither more nor less in different combinations at a display period to complete said circuits to correctly display any one of all said numerals one to nine and naught inclusive whereby only one of any said numerals is displayed by said set at a time and said circuits arranged to display a mutilated numeral in case less than three or more than three of said relays are operated at any display period.

2. In a display system for displaying numerals one to nine and naught inclusive, a set of lamps arranged so that said numerals may be formed and displayed one at a time by lighting said lamps in different combinations, a group of relays, circuits controlled by said relays for lighting said lamps in said different combinations, means for always operating only a predetermined number of said relays neither more nor less in different combinations at a display period to complete said circuits to correctly display any one of all said numerals one to nine and naught inclusive whereby only one of any said numerals is displayed by said set at a time, and said circuits arranged to display a mutilated numeral in case less than said predetermined number or more than said predetermined number of said relays are operated at any display period.

CHARLES M. CANDY.
WILLIAM WALTER OWEN.

REFERENCES CITED

The following references are of record in the file of this patent:

UNITED STATES PATENTS

| Number | Name | Date |
|---|---|---|
| 1,967,887 | Johnston | July 24, 1934 |
| 2,043,707 | Nelson | June 9, 1936 |
| 2,153,737 | Spencer | Apr. 11, 1939 |
| 2,216,610 | Culbertson | Oct. 1, 1940 |
| 2,266,779 | Loughridge | Dec. 23, 1941 |